D. BROOKS.
Insulating Underground Telegraph-Wires.

No. 199,506. Patented Jan. 22, 1878.

Witnesses
Harry Smith
John M. Dumer

Inventor
David Brooks
by his Attorneys
Howson and Son

UNITED STATES PATENT OFFICE.

DAVID BROOKS, OF PHILADELPHIA, PENNSYLVANIA, ASSIGNOR TO BROOKS UNDERGROUND TELEGRAPH CONSTRUCTION COMPANY, (LIMITED,) OF SAME PLACE.

IMPROVEMENT IN INSULATING UNDERGROUND TELEGRAPH-WIRES.

Specification forming part of Letters Patent No. 199,506, dated January 22, 1878; application filed January 9, 1878.

*To all whom it may concern:*

Be it known that I, DAVID BROOKS, of Philadelphia, Pennsylvania, have invented a new and useful Improvement in Insulating and Laying Telegraph-Wires, of which the following is a specification:

The objects of my invention are, first, to prepare telegraph-cables of wires clothed with fibrous wrapping by heating them, then introducing them into heated iron pipes, and finally sealing the ends of the latter; and, second, to maintain the connected cables in a series of pipes in a proper insulated condition by maintaining within the pipes a constant supply of air or gas deprived of moisture, as explained hereinafter.

Figure 1:
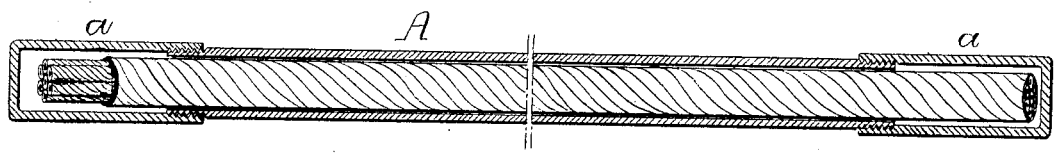

In carrying out my invention, I clothe wire with yarn, preferably cotton yarn, on account of its economy, for cotton, if deprived of its moisture, is an excellent non-conducting medium. The yarn may be applied to the wire by means of any wrapping, braiding, or plaiting machine. I make as many of these wrapped wires as are required into a cable by wrapping them together with jute or other cheap fibrous strands. I then subject the cable to a heat of about 300° to 320° Fahrenheit for a sufficient length of time to insure the evaporation of all the moisture contained in the cotton wrapping, and the evolving of all the gases generated by subjecting the fibers to heat. I then introduce the cable into an iron tube, A, (shown in Figure 1 of the accompanying drawings,) an ordinary lap-welded tube being preferred, and close the ends with caps $a\ a$, so as to prevent the access of moisture to and its absorption by the fibrous wrapping of the wire.

It should be understood that the cable is in a heated condition when introduced into the pipe, which is also heated prior to receiving the cable, so that no moisture can gain access to the latter before the caps $a$ are secured to their places.

Figure 2:
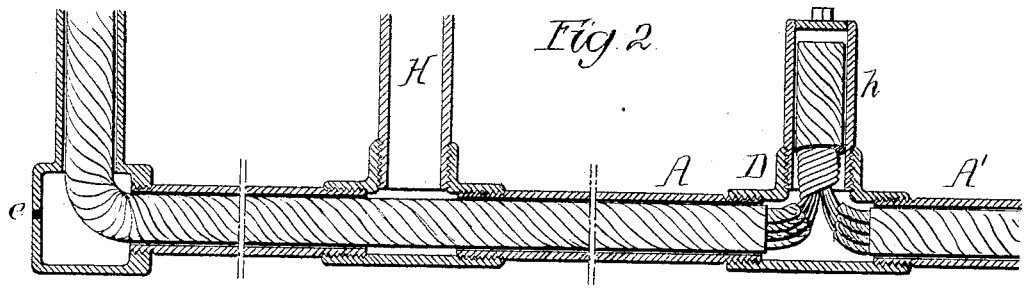

The manner of laying the pipes containing the cables and maintaining the wrappings in a proper insulated condition after the pipes are laid will be best understood by reference to Fig. 2 of the accompanying drawings, in which—

A represents the end of one pipe, and A' the end of an adjacent pipe, both pipes, A and A', containing cables similar to that above described. D is a T-piece, to which the pipes are secured, and into a branch, $h$, of this T-piece the ends of the wires of the cable in each pipe are turned up after being deprived of the wrapping, so that they may be twisted together, metal to metal, after which the twisted wires are again securely wrapped, and the branch $h$ closed by a suitable screw plug or cap. Before the latter is tightly secured, however, I apply a sufficient heat to the T-piece, and to the pipes near the same, to expel any moisture which the fibers near the T-piece may have acquired while the above-described connection was being made.

At any desired point in the length of the connected pipes there should be a branch, H, communicating with a supply of heated air or gas, or of air or gas otherwise deprived of its moisture and under pressure, so that there will always be a pressure of the air or gas in the pipes to maintain the fibrous wrapping of the wires in the dry condition necessary for perfect insulation, there being a small vent, $e$, in the cap at the extreme ends of the coupled pipes for the escape of the air or gas, and this cap having a branch through which the wires may be conveyed to the instrument at the station where they terminate, and there may be branches at intervals for the same purpose.

Air or gas may be deprived of its moisture by being forced through heated chambers prior to being introduced into the pipes; or it may be deprived of moisture by chemical means—for instance, by forcing it through sulphuric acid.

If common coal-gas is injected into the pipes, it may be utilized for illuminating purposes after performing its insulating duties.

I claim as my invention—

1. The mode herein described of preparing telegraph-cables preparatory to laying the same—that is to say, first clothing the wires with a fibrous wrapping and binding them together, then subjecting the cable to heat, and while the cable is hot introducing it into a heated tube, and finally sealing the ends of the same, all substantially as set forth.

2. The mode described of maintaining a cable of wires wrapped with fibrous material in an insulated condition—that is to say, by placing them in pipes within which air or gas deprived of moisture is maintained under pressure, as described.

In testimony whereof I have signed my name to this specification in the presence of two subscribing witnesses.

DAVID BROOKS.

Witnesses:
  HARRY A. CRAWFORD,
  HARRY SMITH.